Nov. 3, 1925.
J. W. FLOWER
PIPE CONNECTION
Filed Jan. 5, 1921
1,559,861
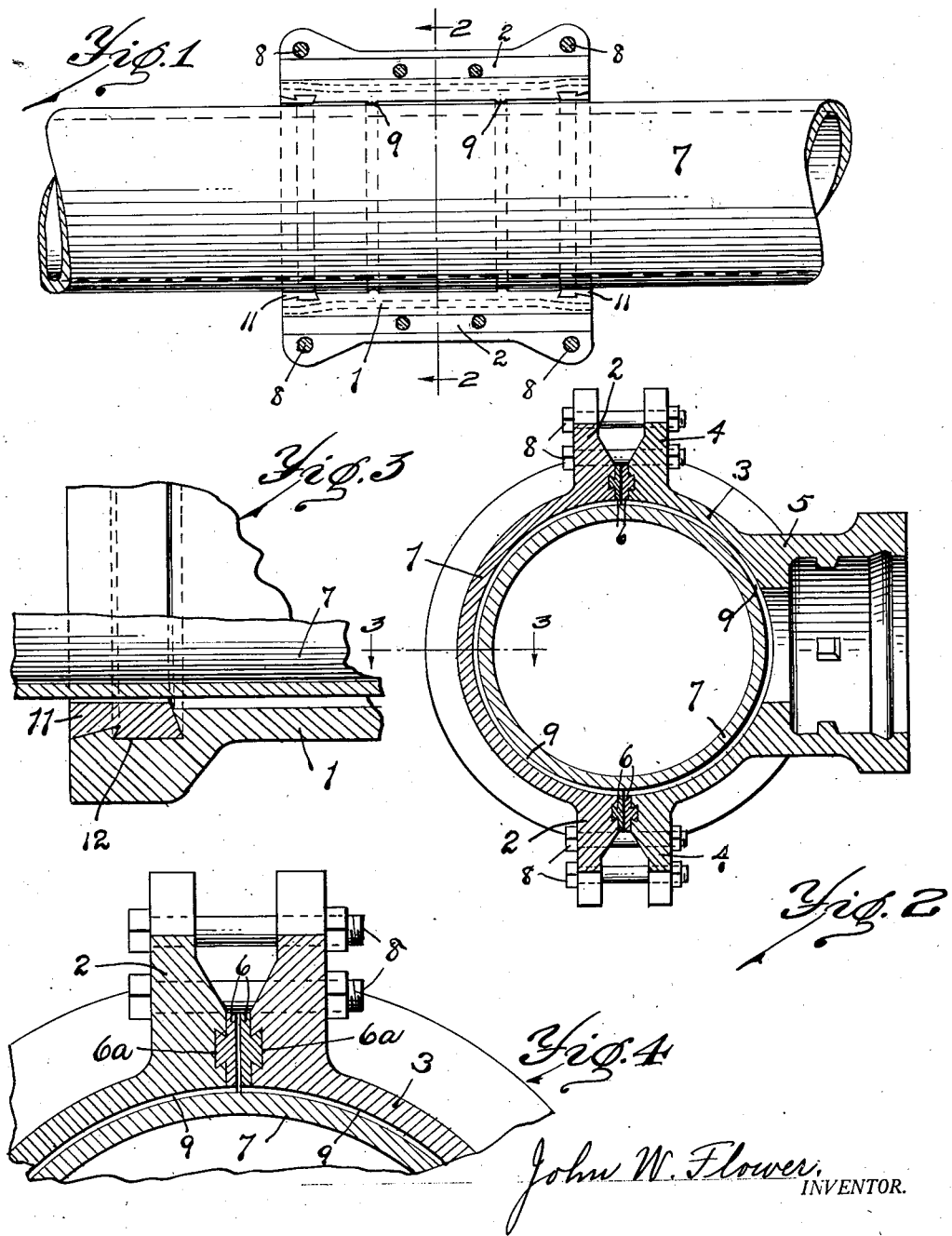
John W. Flower, INVENTOR.
BY
Edward N. Pagelsen, ATTORNEY.

Patented Nov. 3, 1925.

1,559,861

UNITED STATES PATENT OFFICE.

JOHN W. FLOWER, OF DETROIT, MICHIGAN, ASSIGNOR, BY MESNE ASSIGNMENTS, TO MICHIGAN VALVE FOUNDRY AND ENGINEERING COMPANY, OF DETROIT, MICHIGAN, A CORPORATION OF MICHIGAN.

PIPE CONNECTION.

Application filed January 5, 1921. Serial No. 435,120.

*To all whom it may concern:*

Be it known that I, JOHN W. FLOWER, a citizen of the United States, and residing at Detroit, in the county of Wayne and State of Michigan, have invented a new and Improved Pipe Connection, of which the following is a specification.

This invention relates to means for connecting branch pipes to water, gas, air and steam mains already in position, and its object is to provide a T which may be easily attached and which may be calked at all joints to prevent leakage.

Another object of this invention is to manufacture a two-piece T with calking strips along all joints before being assembled so that it may be installed without the use of a furnace to heat the lead or other calking material.

I attain these objects in the construction shown in the accompanying drawing, in which Fig. 1 is a plan of a pipe with one part of this present connection in position. Fig. 2 is a section on the line 2—2 of Fig. 1 on a larger scale. Fig. 3 is a section on the line 3—3 of Fig. 2 on a still larger scale. Fig. 4 is an enlargement of that part of Fig. 2 which shows the joints between the two parts of this T.

Similar reference characters refer to like parts throughout the several views.

It often occurs that valves and branch lines must be attached to street mains and other conduits for water, gas, air and steam, and various devices are provided for this purpose. The T shown in the drawing is generally of the design of one of the connectors most commonly used and the present invention is an improvement over those heretofore produced in that convenient means are provided for preventing leakage. As is usually the case, this T is formed of a substantially semi-cylindrical member 1 having flanges 2 along its longitudinal edges and of a second member which is a substantially similar semi-cylindrical portion 3 having flanges 4 and a hub 5 adapted to receive pipes, valves or whatever else is to be attached thereto.

One difference between these parts and the prior art consists in forming the longitudinal edges of the parts 1 and 3 with dove-tail grooves 6ª and mounting strips 6 of lead or other malleable metal therein, these strips having flat outer surfaces and being of such thickness that when these parts 1 and 3 are attached to a pipe 7 by means of the bolts 8, and drawn together until the internal beads 9 on these parts firmly engage the pipe, there will be a slight space between these strips 6. After the fitting has been properly positioned, these strips are calked down into engagement with the pipe and with each other to form a tight joint along the joints between the parts 1 and 3. The opposed faces of the flanges 2 and 4 are cut away to permit the entrance of proper tools.

Any other desired means may be employed in place of the dove-tail groove to secure the lead strips 6 to the two members 1 and 3 so that they will not be displaced or lost during shipment, for one of the desirable features of this construction is the attachment of these strips in place at the factory where such work may be conveniently done, thus avoiding the necessity of pouring lead into these joints where the T is to be attached to the main, often a very difficult and expensive task.

The inner sides of the ends of the cylindrical portions 1 and 3 are also provided with strips 11 which are poured in position before the T is positioned, preferably before the T is assembled at the factory where the T is made, and the cylindrical parts are preferably provided with dove-tail grooves 12 to retain these metal strips in position. These strips are also calked into place after the T has been assembled and positioned, either before or after the strips 6, as may be desired.

While this particular pipe connection is a T having a central hub 5 of less diameter than the main 7, it is to be understood that the calking strips 6 and 11 may be used with connections and fittings of any other desired form, as the invention does not reside in the particular style or size of the fittings or connections but in calking strips attached thereto along the outer edges of the parts before these connections are assembled and positioned on the mains.

I claim:—

An article of manufacture adapted to be attached to a main pipe and comprising a plurality of parts joining along radial planes extending longitudinally of the pipe, each of the parts being formed to retain a strip of malleable metal along its longitudinal edges, strips of malleable metal mounted in each of said edges before the connection is assembled, and bolts to secure said parts together, said parts being so formed as to expose the edges of said strips so they may be reached with caulking tools throughout their length.

JOHN W. FLOWER.